US012754683B2

(12) United States Patent
Jung et al.

(10) Patent No.: US 12,754,683 B2
(45) Date of Patent: Oct. 6, 2026

(54) BANDWIDTH CONTROL FOR STORAGE PORT COMMUNICATIONS

(71) Applicant: Dell Products L.P., Round Rock, TX (US)

(72) Inventors: Jay Jung, Shrewsbury, MA (US); Krishna Deepak Nuthakki, Bangalore (IN); Arieh Don, Newton, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 19/020,445

(22) Filed: Jan. 14, 2025

(65) Prior Publication Data

US 2026/0202979 A1 Jul. 16, 2026

(51) Int. Cl.
*G06F 3/00* (2006.01)
*G06F 3/06* (2006.01)
*G06F 12/00* (2006.01)

(52) U.S. Cl.
CPC ............ *G06F 3/0635* (2013.01); *G06F 3/061* (2013.01); *G06F 3/0653* (2013.01); *G06F 3/067* (2013.01)

(58) Field of Classification Search
CPC ...... G06F 3/0635; G06F 3/061; G06F 3/0653; G06F 3/067
USPC .......................................................... 711/154
See application file for complete search history.

(56) References Cited

U.S. PATENT DOCUMENTS

| | | | | |
|---|---|---|---|---|
| 5,783,969 A * | 7/1998 | Luz | H03F 1/52 | 330/207 P |
| 5,909,463 A * | 6/1999 | Johnson | H04L 27/0002 | 370/464 |
| 6,047,025 A * | 4/2000 | Johnson | H03H 21/0012 | 375/232 |
| 6,078,990 A * | 6/2000 | Frazier | G06F 3/0632 | 711/170 |
| 6,976,134 B1 * | 12/2005 | Lolayekar | H04L 67/101 | 710/316 |
| 7,421,509 B2 * | 9/2008 | Lolayekar | H04L 67/1008 | 370/231 |
| 8,150,260 B2 * | 4/2012 | Yang | H04L 47/13 | 398/58 |

(Continued)

*Primary Examiner* — Sheng Jen Tsai

(74) *Attorney, Agent, or Firm* — Krishnendu Gupta; Nikhil Patel

(57) ABSTRACT

One or more aspects of the present disclosure relate to controlling input/output consumption to prevent port congestion in storage networks. A storage array detects initiator port speeds and maps them to storage ports using masking information. The system tracks aggregate IO consumption across connected storage ports, including in NPIV environments where multiple WWNs share a physical host bus adapter port. When consumption exceeds a threshold of the initiator's bandwidth capacity, the system implements IO limiting to prevent overwhelming the initiator with return payload. Using FDMI information, the system identifies WWNs associated with the same physical port and manages bandwidth allocation across initiators through equal or weighted distribution. This prevents switch credit buffer overflow by controlling data transmission rates between storage ports and initiators. The solution addresses traditional single-WWN configurations and NPIV environments where multiple WWNs operate on a single physical port.

20 Claims, 5 Drawing Sheets

(56) References Cited

U.S. PATENT DOCUMENTS

| | | | | |
|---|---|---|---|---|
| 8,539,197 | B1 * | 9/2013 | Marshall | G06F 3/0613 711/112 |
| 9,037,826 | B1 * | 5/2015 | Brooker | G06F 3/0653 711/167 |
| 9,137,005 | B2 * | 9/2015 | Weide | H04L 49/3054 |
| 9,372,870 | B1 * | 6/2016 | Levy | H04L 67/1001 |
| 9,426,096 | B2 * | 8/2016 | Gravel | H04L 1/00 |
| 9,495,192 | B2 * | 11/2016 | Mehta | G06F 9/5044 |
| 9,577,892 | B2 * | 2/2017 | Chaudhary | G06F 11/3093 |
| 9,747,180 | B1 * | 8/2017 | Fair | G06F 11/2005 |
| 9,800,459 | B1 * | 10/2017 | Fair | H04L 41/0672 |
| 9,817,732 | B1 * | 11/2017 | Fair | G06F 11/2007 |
| 9,858,233 | B1 * | 1/2018 | Fair | G06F 13/4221 |
| 9,971,713 | B2 * | 5/2018 | Asaad | G06F 12/0864 |
| 10,129,081 | B1 * | 11/2018 | Fair | H04L 41/40 |
| 10,254,991 | B2 * | 4/2019 | Bharadwaj | G06F 3/0644 |
| 10,275,351 | B2 * | 4/2019 | Long | G06F 3/0659 |
| 10,394,737 | B1 * | 8/2019 | Ngo | G06F 13/4022 |
| 10,474,367 | B1 * | 11/2019 | Mallick | G06F 3/065 |
| 10,521,357 | B1 * | 12/2019 | Ramey | G06F 12/1027 |
| 10,938,730 | B2 * | 3/2021 | Smith | G06F 13/385 |
| 11,119,952 | B2 * | 9/2021 | Torudbakken | G06F 12/0868 |
| 11,750,522 | B2 * | 9/2023 | Wu | H04L 47/225 |
| 2003/0079018 | A1 * | 4/2003 | Lolayekar | G06F 3/067 709/239 |
| 2012/0131309 | A1 * | 5/2012 | Johnson | G06F 9/323 712/E9.004 |
| 2013/0151646 | A1 * | 6/2013 | Chidambaram | H04L 49/90 709/213 |
| 2013/0332614 | A1 * | 12/2013 | Brunk | G06F 3/0685 709/226 |
| 2014/0337562 | A1 * | 11/2014 | Long | G06F 3/0679 711/126 |
| 2015/0074299 | A1 * | 3/2015 | Maniwa | G06F 13/10 710/74 |
| 2015/0312126 | A1 * | 10/2015 | Deshpande | H04L 41/0896 709/216 |
| 2017/0206027 | A1 * | 7/2017 | Nakajima | G06F 3/0617 |
| 2020/0089536 | A1 * | 3/2020 | Sumangala | G06F 3/0662 |
| 2020/0110717 | A1 * | 4/2020 | Vokaliga | G06F 13/20 |
| 2021/0099520 | A1 * | 4/2021 | Anchi | H04L 41/0246 |
| 2022/0229582 | A1 * | 7/2022 | Rao | G06F 3/0635 |
| 2023/0134266 | A1 * | 5/2023 | Sundararajan | G06F 16/128 711/154 |
| 2025/0165145 | A1 * | 5/2025 | Peterson | G06F 3/0659 |
| 2025/0238258 | A1 * | 7/2025 | Mayraz Matosevich | G06F 3/0653 |
| 2025/0300931 | A1 * | 9/2025 | Desanti | H04L 47/122 |
| 2025/0356725 | A1 * | 11/2025 | Nowak | G07F 17/3225 |

* cited by examiner

BANDWIDTH CONTROL FOR STORAGE PORT COMMUNICATIONS

BACKGROUND

Storage systems commonly utilize fiber channel networks to facilitate communication between host systems and storage arrays. In these environments, host systems are equipped with host bus adapters (HBAs) that connect to storage arrays through fiber channel switches using World Wide Names (WWNs) for identification. The switches employ credit buffers to manage data flow between hosts and storage arrays, acting as temporary storage to handle speed variations between communicating devices. Modern storage environments can operate in traditional single WWN configurations and N-Port ID Virtualization (NPIV) environments, where a single physical HBA port may expose multiple WWNs to support virtualization. These systems typically negotiate specific bandwidth speeds between components, with standard configurations supporting speeds up to 16 gigabits per second. However, actual throughput is generally lower due to protocol overhead and frame encapsulation requirements.

SUMMARY

One or more aspects of the present disclosure relate to bandwidth control for storage port communications. In embodiments, a negotiated speed of an initiator port is determined. Initiator ports are mapped to storage ports based on storage array masking information. When the IO consumption exceeds a threshold percentage of the initiator port's bandwidth capacity is determined. Further, IO consumption of the initiator port is limited when the threshold percentage is reached to prevent the initiator port from being overwhelmed by return payload from the multiple storage ports.

In embodiments, the negotiated speed of the initiator port can be detected by reading the speed from a switch associated with the initiator port.

In embodiments, a plurality of World Wide Names (WWNs) corresponding to a single physical host bus adapter (HBA) port can be detected by reading Fabric Device Management Interface (FDMI) information corresponding to the initiator port from the switch.

In embodiments, aggregate IO consumption across all WWNs associated with the single physical HBA port can be monitored. Additionally, IO consumption can be limited based on the aggregate consumption of all WWNs on the single HBA port.

In embodiments, bandwidth allocation across multiple initiator ports can be normalized using one of equal distribution or weighted distribution.

In embodiments, credit buffer overflow in the switch can be prevented by controlling IO consumption between the initiator port and the storage ports to avoid exhausting available credit buffers.

In embodiments, credit buffer exhaustion can be prevented by controlling a rate at which data is sent from the storage ports to the initiator port.

In embodiments, both IO operations per second (IOPS) and megabytes per second across the storage ports can be tracked.

In embodiments, the initiator port can include a host bus adapter (HBA) port operating in an NPIV environment with multiple WWNs associated with a single physical HBA port.

In embodiments, the initiator port can include a host bus adapter (HBA) port operating in a non-NPIV environment.

Other technical features may be readily apparent to one skilled in the art from the following figures, descriptions, and claims.

BRIEF DESCRIPTION OF THE DRAWINGS

The preceding and other objects, features, and advantages will be apparent from the following more particular description of the embodiments, as illustrated in the accompanying drawings. Like reference, characters refer to the same parts throughout the different views. The drawings are not necessarily to scale, emphasis instead being placed upon illustrating the embodiments'principles.

DETAILED DESCRIPTION

Figure 1:
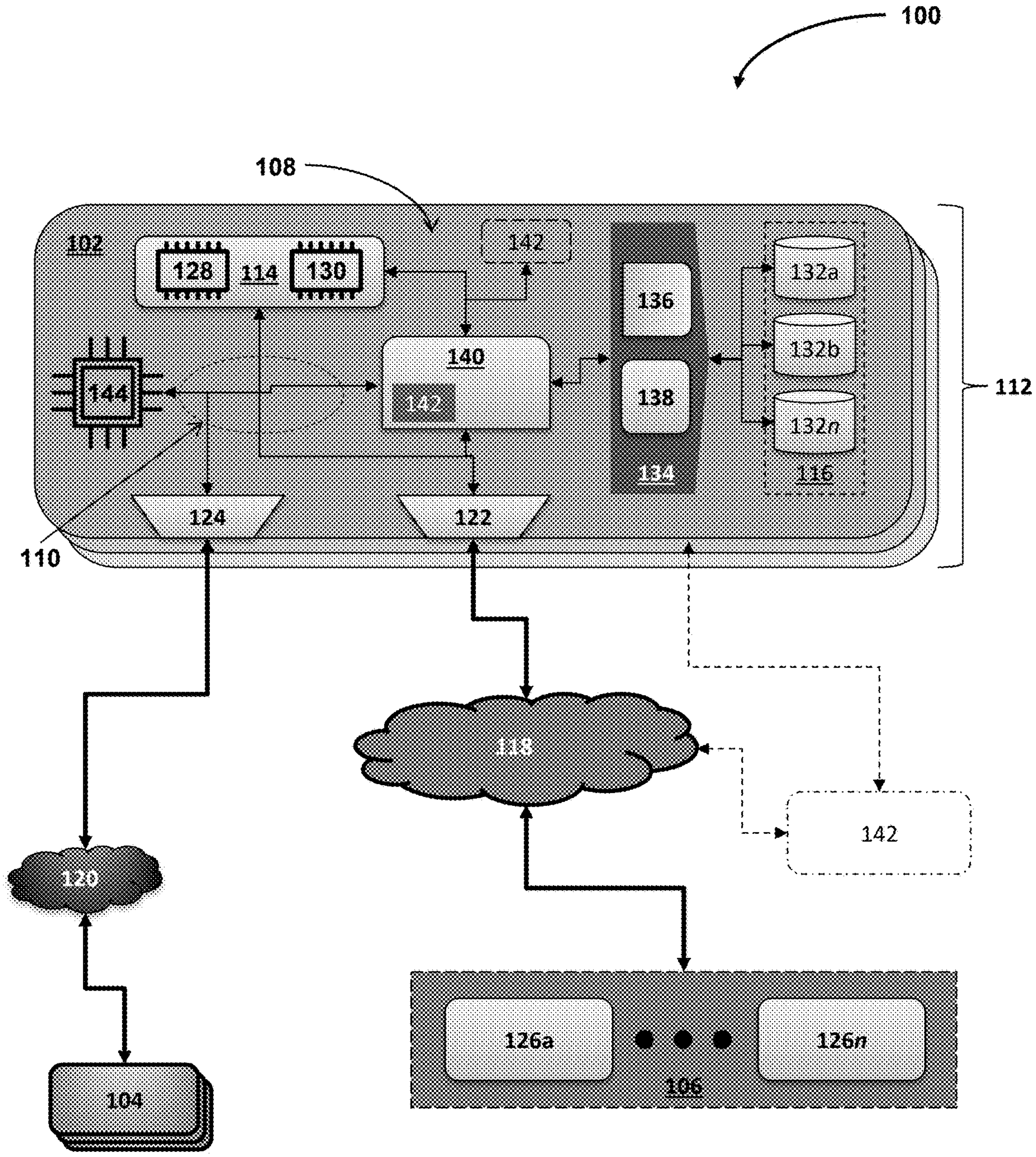
FIG. 1 illustrates a distributed network environment in accordance with embodiments of the present disclosure.

In modern storage environments, storage arrays utilize fiber channel protocols to enable communication between initiator ports and storage ports through switches. Host systems typically employ host bus adapter (HBA) cards containing multiple ports, each identified by a unique World Wide Name (WWN) and capable of negotiating specific transmission speeds with the switch, such as 16 gigabits per second.

Current storage array technologies implement basic bandwidth control mechanisms between individual initiator-storage port pairs, primarily focusing on preventing congestion when an initiator's negotiated speed falls below the storage port's capability. This approach helps mitigate "slow drain" scenarios where hosts cannot process incoming data quickly enough from the switch, leading to network congestion.

However, significant challenges arise in contemporary storage environments where initiators frequently connect to multiple storage ports simultaneously. For instance, when a single initiator port operating at 16 Gb/s connects to two storage ports, each capable of 16 Gb/s, the potential exists for 32 Gb/s of return traffic-double what the initiator can process. This oversubscription scenario becomes particularly problematic as initiators send multiple large read commands to different storage ports, overwhelming the initiator with returning data.

The situation becomes even more complex in N-Port ID Virtualization (NPIV) environments, where a single physical HBA port may present multiple WWNs. Each virtual WWN can independently request substantial amounts of read data in these cases despite sharing the physical port's limited bandwidth capacity.

These scenarios lead to switch credit buffer exhaustion, a critical issue in fiber channel networks. Credit buffers serve as temporary storage within switches to manage speed disparities between communicating ports. When storage arrays transmit data faster than hosts can consume, these buffers become depleted, triggering network-wide congestion affecting other hosts sharing the network.

Embodiments of the present disclosure address these challenges through a comprehensive approach to bandwidth management and congestion prevention. The embodiments actively monitor aggregate input/output (IO) consumption across all storage ports mapped to an initiator, tracking both IO operations per second and megabytes per second. When consumption approaches a threshold percentage of the initiator's bandwidth capacity (typically 80%), the embodiments implement protective measures to prevent the initiator from being overwhelmed.

In NPIV environments, embodiments of the present disclosure utilize Fabric Device Management Interface (FDMI) information from the switch to identify and map WWNs belonging to the same physical port. This enables effective monitoring and management of aggregate IO consumption across all virtual WWNs associated with a single physical HBA port.

The embodiments implement sophisticated credit buffer management by controlling data transmission rates from storage ports to initiators. This proactive approach prevents buffer overflow conditions and maintains optimal network performance. Additionally, the embodiments support equal and weighted distribution methods for normalizing bandwidth allocation across multiple initiators, ensuring fair and efficient resource utilization.

Through these mechanisms, embodiments of the present disclosure effectively prevent fanout and oversubscription issues while maintaining optimal storage network performance. The solution proves particularly valuable in complex environments where initiators manage multiple storage port connections or operate in NPIV configurations with multiple virtual WWNs sharing physical port bandwidth.

Regarding FIG. 1, a distributed network environment 100 can include a storage array 102, a remote system 104, and hosts 106. In embodiments, the storage array 102 can include components 108 that perform one or more distributed file storage services. In addition, the storage array 102 can include one or more internal communication channels 110 like Fibre channels, busses, and communication modules that communicatively couple the components 108. Further, the distributed network environment 100 can define an array cluster 112, including the storage array 102 and one or more other storage arrays.

In embodiments, the storage array 102, components 108, and remote system 104 can include a variety of proprietary or commercially available single or multi-processor systems (e.g., parallel processor systems). Single or multi-processor systems can include central processing units (CPUs), graphical processing units (GPUs), and others. Additionally, the storage array 102, remote system 104, and hosts 106 can virtualize one or more of their respective physical computing resources (e.g., processors (not shown), memory 114, and persistent storage 116).

In embodiments, the storage array 102 and, e.g., one or more hosts 106 (e.g., networked devices) can establish a network 118. Similarly, the storage array 102 and a remote system 104 can establish a remote network 120. Further, the network 118 or the remote network 120 can have a network architecture that enables networked devices to send/receive electronic communications using a communications protocol. For example, the network architecture can define a storage area network (SAN), local area network (LAN), wide area network (WAN) (e.g., the Internet), an Explicit Congestion Notification (ECN), Enabled Ethernet network, and the like. Additionally, the communications protocol can include a Remote Direct Memory Access (RDMA), TCP, IP, TCP/IP protocol, SCSI, Fibre Channel, Remote Direct Memory Access (RDMA) over Converged Ethernet (ROCE) protocol, Internet Small Computer Systems Interface (ISCSI) protocol, NVMe-over-fabrics protocol (e.g., NVMe-over-ROCEv2 and NVMe-over-TCP), and the like.

Further, the storage array 102 can connect to the network 118 or remote network 120 using one or more network interfaces. The network interface can include a wired/wireless connection interface, bus, data link, and the like. For example, a host adapter (HA 122), e.g., a Fibre Channel Adapter (FA) and the like, can connect the storage array 102 to the network 118 (e.g., SAN). Further, the HA 122 can receive and direct IOs to one or more of the storage array's components 108, as described in greater detail herein.

Likewise, a remote adapter (RA 124) can connect the storage array 102 to the remote network 120. Further, the network 118 and remote network 120 can include communication mediums and nodes that link the networked devices. For example, communication mediums can include cables, telephone lines, radio waves, satellites, infrared light beams, etc. The communication nodes can also include switching equipment, phone lines, repeaters, multiplexers, and satellites. Further, the network 118 or remote network 120 can include a network bridge that enables cross-network communications between, e.g., the network 118 and remote network 120.

In embodiments, hosts 106 connected to the network 118 can include client machines 126*a-n*, running one or more applications. The applications can require one or more of the storage array's services. Accordingly, each application can send one or more input/output (IO) messages (e.g., a read/write request or other storage service-related request) to the storage array 102 over the network 118. Further, the IO messages can include metadata defining performance requirements according to a service level agreement (SLA) between hosts 106 and the storage array provider.

In embodiments, the storage array 102 can include a memory 114, such as volatile or nonvolatile memory. Further, volatile and nonvolatile memory can include random access memory (RAM), dynamic RAM (DRAM), static RAM (SRAM), and the like. Moreover, each memory type can have distinct performance characteristics (e.g., speed corresponding to reading/writing data). For instance, the types of memory can include register, shared, constant, user-defined, and the like. Furthermore, in embodiments, the memory 114 can include global memory (GM 128) that can cache IO messages and their respective data payloads. Additionally, the memory 114 can include local memory (LM 130) that stores instructions that the storage array's processors 144 can execute to perform one or more storage-related services. For example, the storage array 102 can have a multi-processor architecture that includes one or more CPUs (central processing units) and GPUs (graphical processing units).

In addition, the storage array 102 can deliver its distributed storage services using persistent storage 116. For example, the persistent storage 116 can include multiple thin-data devices (TDATs) such as persistent storage drives 132*a-n*. Further, each TDAT can have distinct performance capabilities (e.g., read/write speeds) like hard disk drives (HDDs) and solid-state drives (SSDs).

Further, the HA 122 can direct one or more IOs to an array component 108 based on their respective request types and metadata. In embodiments, the storage array 102 can include a device interface (DI 134) that manages access to the array's persistent storage 116. For example, the DI 134 can include a disk adapter (DA 136) (e.g., storage device controller), flash drive interface 138, and the like that control access to the array's persistent storage 116 (e.g., storage devices 132*a-n*).

Likewise, the storage array 102 can include an Enginuity Data Services processor (EDS 140) that can manage access to the array's memory 114. Further, the EDS 140 can perform one or more memory and storage self-optimizing operations (e.g., one or more machine learning techniques) that enable fast data access. Specifically, the operations can implement techniques that deliver performance, resource availability, data integrity services, and the like based on the SLA and the performance characteristics (e.g., read/write times) of the array's memory 114 and persistent storage 116. For example, the EDS 140 can deliver hosts 106 (e.g., client machines 126*a-n*) remote/distributed storage services by virtualizing the storage array's memory/storage resources (memory 114 and persistent storage 116, respectively).

In embodiments, the storage array 102 can also include a controller 142 (e.g., management system controller) that can reside externally from or within the storage array 102 and one or more of its components 108. When external from the storage array 102, the controller 142 can communicate with the storage array 102 using any known communication connections. For example, the communications connections can include a serial port, parallel port, network interface card (e.g., Ethernet), etc. Further, the controller 142 can include logic/circuitry that performs one or more storage-related services. For example, the controller 142 can have an architecture designed to manage the storage array's computing, processing, storage, and memory resources as described in greater detail herein.

Figure 2:
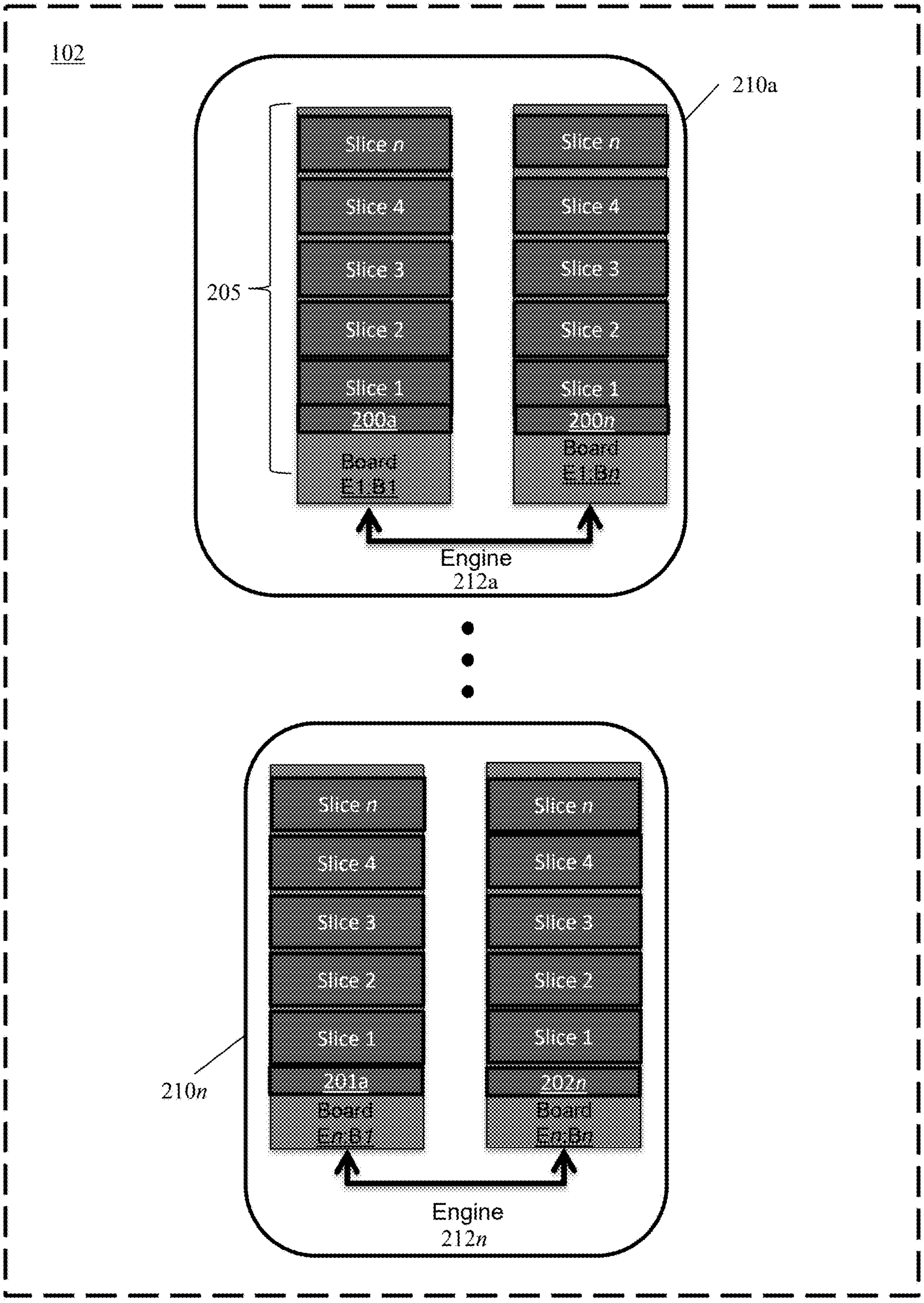
FIG. 2 is a block diagram of engines of a storage array, including director boards, in accordance with embodiments of the present disclosure.

Regarding FIG. 2, the storage array 102 includes engines 212*a-n* that deliver storage services. Each engine 212*a-n* has hardware circuity or software components required to perform the storage services. Additionally, the array 102 can house each engine 212*a-n* in one or more of its shelves (e.g., housing) 210*a-n* that interface with the array's cabinet or rack (not shown).

In embodiments, each engine 212*a-n* can include director boards (boards) E1:B1-E1:Bn, En:B1-En:Bn. The boards E1:B1-E1:Bn, En:B1-En:Bn can have slices 205, each comprising hardware or software elements that perform specific storage services. Each board's slices 1-n can correspond to or emulate one or more of the storage array's components 108 described in FIG. 1. For example, each board's Slice 1 can correspond to or emulate the EDS 140 or controller 142 of FIG. 1. In embodiments, the slices 2-n can emulate one or more of the array's other components 101. Further, the boards B1-n can include memory 200*a-n*-201*a-n*, respectively. The memory 200*a-n*-201*a-n* can be dynamic random-access memory (DRAM).

In embodiments, each emulated EDS 140 (collectively "EDS 140") can provision its respective board with memory from the array's global memory 128. For example, the EDS 140 can uniformly carve out at least one global memory section into x-sized memory portions 200*a-n*-201*a-n*. Further, the EDS 140 can size each global memory section or the x-sized memory portions 200*a-n*-201*a-n* to store data structure filters like cuckoo filters. The EDS 140 can size each global memory section or the x-sized portions based on an IO workload's predicted metrics related to the amount and frequency of sequential IO write patterns. For instance, the predicted metrics can define the amount of data the x-sized memory portions 200*a-n*-201*a-n* can be required to store.

Figure 3:
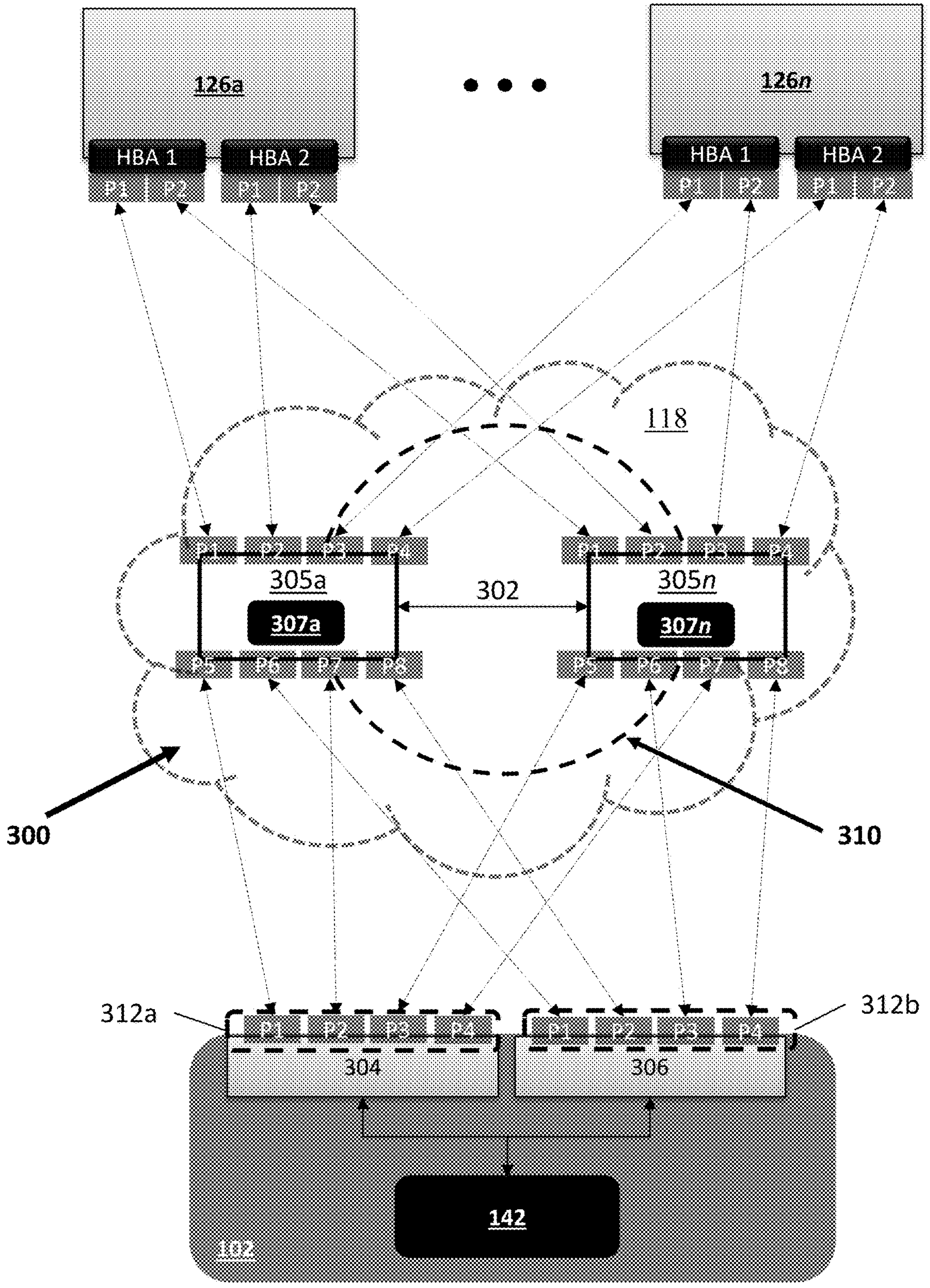
FIG. 3 is a block diagram of a communications network in accordance with embodiments of the present disclosure.

Regarding FIG. 3, a network (e.g., a storage area network) 118 can include one or more interconnected nodes (e.g., switches) 305*a-n* that define a structure and flow of information between devices on the network 118. In embodiments, the network can interconnect the nodes 305*a-n* using links 310. The links 310 can allow the nodes 305*a-n* to exchange messages using one or more communication protocols. The communications protocols can define a method (e.g., rules, syntax, semantics, and the like) by which the nodes 305*a-n* can pass messages and signals to other networked devices. Further, the protocol can define a communications synchronization process and error recovery methods. The network 118 can implement the protocol using hardware, software, or a combination of both. The protocol's rules, syntax, and semantics can include, e.g., a circuit switching, message switching, or packet switching technique. In embodiments, the nodes 305*a-n* can comprise networking hardware such as computing nodes (e.g., computers), servers, networking hardware, bridges, switches, hubs, and the like.

For example, the nodes 305*a-n* can correspond to Fibre Channel (FC) switches connected via an inter-switch link (ISL) 302. The ISL 302 allows communication and data transfer between switches, creating larger fabric topologies and providing redundancy. ISLs are typically high-speed links that carry traffic between switches, allowing devices connected to different switches to communicate with each other as if they were on the same switch. In the context of SAN FC Zoning, ISLs are crucial in connecting multiple switches to form a more extensive, more flexible network infrastructure.

The network 118 can arrange the nodes 305*a-n* to define one or more of a Chain Network (CHN), Y-Network (YN), Wheel Network (WN), Circle Network (CIRN), All-Channel Network (ACN) such as a Star Network, and the like. In a CHN, the nodes 305*a-n* have a hierarchical relationship (e.g., topology) that requires communications to flow through a formal chain. In a YN, the nodes 305*a-n* have a topology resembling an upside-down 'Y' (e.g., information flows upward and downward through the hierarchy). In a WN, data flows to and from a networked device (e.g., array 102). In a CIRN, the nodes 305*a-n* have a topology that restricts the flow of information to/from one node of the nodes to an adjacent node (e.g., a neighboring node). In embodiments, each node can have at most two adjacent nodes. In an ACN, the nodes 305*a-n* have a structure that allows communications to flow upward, downward, and laterally among each node. As illustrated, the network 118 can have an arrangement 300 consistent with an ACN. In embodiments, the network 118 can define one or more communication paths between the array 102 and hosts 1226*a-n*.

In embodiments, hosts 126*a-n* can connect to the network (e.g., SAN) 119 using Host Bus Adapters (HBAs) (e.g., respective HBAs 1-2) that are substantially similar to Network Interface Cards (NICs) in Ethernet networks. Each HBA (respective HBAs 1-2) includes ports P1-2 that are assigned unique World Wide Names (WWNs). The HBA ports P1-2 can connect to switch ports (e.g., ports P1-4 of switches 305*a-n*) via Fibre Channel links.

In embodiments, FC switches (e.g., switches 305*a-n*) can include multiple ports P1-8, each with its own WWN. The switches 305*a-n* can include switch host ports P1-4 connected to hosts. The switches 305*a-n* can also include switch storage ports P5-8 connected to one or more storage arrays (e.g., the storage array 102). Further, the switches 305*a-n* can be interconnected using Inter-Switch Links (ISLs) for redundancy and expanded connectivity.

In embodiments, a storage array 102 can include director boards 304/306 (e.g., substantially like director boards En:Bn of FIG. 2), each including a small input/output (IO) card (SLIC) 312*a-b*. Each SLIC can include multiple FC ports (e.g., ports P1-4) connected to corresponding switch storage ports P5-8 of respective switches 305*a-n*. Like other components (e.g., ports) of the network 118, the FC ports P1-4 on each SLIC 312*a-b* are assigned World Wide Names (WWNs). The SLICs 312*a-b* provide an interface between the storage array 102 and the external fabric corresponding to the network 118. Accordingly, the SLICs 312*a-b* allow the storage array 102 to connect to multiple FC switches (e.g., the FC switches 305*a-n*).

In embodiments, WWNs are unique identifiers in Fibre Channel networks, similar to IP addresses in Ethernet networks. Each device (e.g., HBA port, switch port, storage array port) is assigned a unique WWN. The WWNs can identify each device and port in the SAN 118. Additionally, the WWNs can be used to create logical zones that define which devices can communicate with each other. Specifically, zoning techniques use WWNs to create logical groups of devices that are allowed to communicate. Further, networked devices (e.g., the hosts 126*a-n*, FC switches 305*a-n*, and storage array 102) on the SAN 118 can implement multipathing techniques that use the WWNs to identify and manage multiple paths between the networked devices. Using WWNs, SAN administrators can precisely control and manage connectivity, security, and resource allocation in the Fibre Channel network, ensuring that only authorized devices can communicate and access specific resources.

In embodiments, the storage array 102 can include a controller 142 configured to manage and prevent host port congestion through several key mechanisms. The controller 142 can include a memory and at least one processor (e.g., components 400 of FIG. 4) to execute the congestion prevention functionality.

In embodiments, the controller 142 first detects the negotiated speed of initiator ports (e.g., ports P1-2 of HBAs 1-2 of hosts 126*a-n*) by reading speed information directly from the switch (e.g., one or more of the switches 305*a-n*) associated with each initiator port. This enables the controller 142 to understand the actual bandwidth capabilities of each connected host 126*a-n*.

For mapping and monitoring purposes, the controller 142 maintains masking information that defines which initiator ports (e.g., ports P1-2 of HBAs 1-2 of hosts 126*a-n*) are mapped to which storage ports (e.g., ports P1-4 of director boards 304/306). Using this mapping information, the controller 142 actively monitors input/output (IO) consumption across all storage ports to which each initiator port is mapped.

In embodiments, the controller 142 can implement several mechanisms for determining and limiting bandwidth when thresholds are reached. For example, the controller 142 can monitor IO operations per second (IOPS) and megabytes per second metrics across all storage ports to establish the current consumption levels. For initiators with multiple WWNs in NPIV environments, the controller 142 aggregates the IO consumption across all WWNs associated with the single physical HBA port to get an accurate total bandwidth usage.

When monitoring consumption, the controller 142 tracks the combined data flow from all array ports mapped to a given initiator. This is critical because the congestion occurs when multiple array ports (each capable of sending at full speed, e.g., 16 Gbps) simultaneously send data to a single initiator port.

In embodiments, each switch 305*a-n* can include credit buffers 307*a-n* that serve as temporary storage in the switch to handle speed mismatches between devices. For example, the credit buffers 307*a-n* are specialized components within the Fibre Channel switches 305*a-n* that serve as temporary storage mechanisms to handle speed variations between communicating devices. Even when devices operate at nominally identical speeds (e.g., 16 Gbps), slight variations in actual processing speeds can occur where one device may be temporarily faster or slower.

The primary purpose of the credit buffers 307*a-n* is to act as a speed equalization mechanism. When the array 102 sends data faster than a host 126*a-n* can process, the data is temporarily stored in these credit buffers 307*a-n* until the host 126*a-n* can consume it. Similarly, when handling write operations, write data is stored in the credit buffers 307*a-n* while waiting for the storage array 102 to read it.

Under normal operating conditions, when hosts 126*a-n* and the array 102 operate at approximately the same speed, there are sufficient credit buffers to handle the temporary speed mismatches. However, credit buffer exhaustion can occur in several scenarios. For example, credit buffer exhaustion can occur when the array 102 pumps data into a switch 305*a-n* faster than the hosts 126*a-n* can drain it. Credit buffer exhaustion can also occur when multiple array ports simultaneously send data to a single host port. Further, credit buffer exhaustion can occur when the total incoming bandwidth exceeds the host's capacity to process it.

When credit buffers become exhausted, the switches 305*a-n* cannot accept new data, leading to a "slow drain." This congestion can spread beyond the affected ports and impact other hosts 126*a-n* and array ports attempting to communicate through the switches. The switches 305*a-n* then respond to new communication attempts by indicating that no credit buffers are available.

The problem becomes particularly acute in oversubscription scenarios, where multiple array ports (each capable of 16 Gbps) send data to a single host port that can only process 16 Gbps. In such cases, the credit buffers 307 *a-n* quickly become consumed as they attempt to hold the excess data waiting to be processed by the host Accordingly, the controller 142 can use the switch's credit buffers 307*a-n* as a key mechanism for implementing bandwidth limits. For example, when the threshold is reached, the controller 142 can prevent credit buffer exhaustion by controlling the rate at which data is sent from the storage ports to the initiator port. For bandwidth normalization, the controller 142 can implement equal or weighted distribution methods across multiple initiator ports. In equal distribution, available bandwidth is divided evenly among initiators, while weighted distribution allows for prioritization based on specific criteria.

When implementing limits, the controller 142 typically sets the threshold at 80% of the published bandwidth capacity. This accounts for protocol overhead in Fibre Channel networks, where achievable throughput is lower than the theoretical maximum due to frame overhead and error correction requirements. The controller 142 prevents congestion spread by monitoring and controlling IO consumption between the initiator and storage ports to avoid exhausting available credit buffers. This is particularly important because when the credit buffers 307*a-n* become exhausted, the impact can affect other hosts and ports beyond those directly involved in the congested communications.

The solution is compatible with existing array technologies that control bandwidth between individual initiator-storage port pairs, particularly in cases where speed mismatches exist. However, it extends this capability to handle the more complex scenarios of multiple storage ports or multiple WWNs communicating with a single physical host port.

This comprehensive approach ensures that host ports are not overwhelmed by return payload from multiple storage ports, maintaining optimal performance across the storage network while preventing the spread of congestion conditions.

Figure 4:
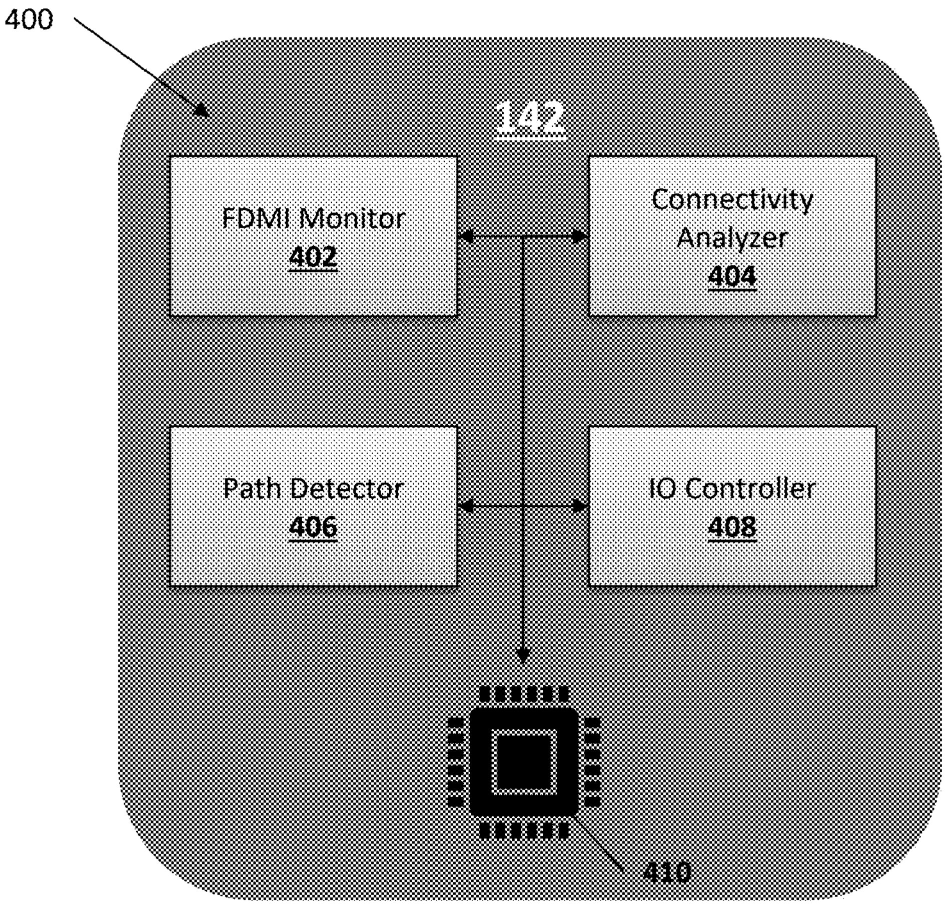
FIG. 4 is a block diagram of a controller in accordance with embodiments of the present disclosure.

Regarding FIG. 4, a storage array (e.g., the storage array 102 of FIG. 1) can include a controller 142 with hardware, logic, and circuitry 400 that detects initiator port speeds, monitors IO consumption across mapped storage ports, and implements bandwidth limits using credit buffers when consumption exceeds thresholds, while supporting both NPIV environments through FDMI-based WWN management and bandwidth normalization across multiple initiator ports.

In embodiments, the controller 142 can include an FDMI monitor 402 that reads Fabric Device Management Interface information from switches (e.g., the switches 305*a-n* of FIG. 3) to detect and map multiple World Wide Names (WWNs) corresponding to a single physical host bus adapter (HBA) port. The FDMI monitor 402 can analyze FDMI data to determine which WWNs belong to the same physical port, enabling proper bandwidth management in NPIV environments. The monitor 402 also extracts maximum bandwidth capability information for each host initiator directly from the switch, which is critical for establishing appropriate threshold limits. By maintaining current FDMI information, the monitor 402 can treat multiple WWNs as a single unit for bandwidth management purposes, preventing oversubscription scenarios where multiple virtual ports could otherwise exceed the physical port's bandwidth capacity. The FDMI monitor 402 works with other controller components to ensure accurate bandwidth allocation and congestion prevention, particularly in complex NPIV environments where multiple virtual ports share the same physical resources.

In embodiments, the controller 142 can include a connectivity analyzer 404 that maps initiator ports to storage ports using the array's masking information. The analyzer 404 detects the negotiated speed of each initiator port by reading this information directly from the switches to determine the bandwidth capabilities of connected hosts. The analyzer 404 maintains current mapping information to track which initiators can communicate with which storage ports, providing essential data for monitoring aggregate IO consumption. In oversubscription scenarios, the connectivity analyzer 404 helps identify situations where a single initiator port is connected to multiple array ports, each capable of sending at full speed (e.g., 16 Gbps). This information is crucial for preventing congestion scenarios where combined data flow from multiple array ports could overwhelm a single initiator's capacity. The analyzer 404 works with other controller components, particularly the path detector 406 and IO controller 406, to ensure proper bandwidth management and congestion prevention across a storage network (e.g., the network 108 of FIG. 1).

In embodiments, the controller 142 includes a path detector 406 that tracks and monitors active communication paths between initiator and storage ports in real-time. The path detector 406 measures IO operations per second (IOPS) and megabytes per second metrics across all active paths to establish current consumption levels. For NPIV environments, the path detector aggregates 406 IO consumption data across all WWNs associated with the same physical HBA port to determine total bandwidth usage. When monitoring consumption, the path detector 406 tracks the combined data flow from all array ports mapped to a given initiator, which is crucial for identifying potential congestion scenarios where multiple array ports (each capable of sending at full speed, e.g., 16 Gbps) are simultaneously sending data to a single initiator port. The path detector 406 works with the IO controller 408 to identify when consumption approaches threshold levels, enabling proactive bandwidth management before credit buffer exhaustion occurs. By maintaining current path utilization data, the path detector 406 helps prevent oversubscription scenarios where the combined bandwidth from multiple array ports could overwhelm an initiator's capacity.

In embodiments, the controller 142 can include an IO controller 408 that implements bandwidth-limiting mechanisms by controlling the rate at which data is sent from storage ports to initiator ports when consumption thresholds are reached. The IO controller 408 prevents credit buffer overflow and exhaustion through active management of IO consumption between initiator ports and storage ports. The IO controller 408 typically sets bandwidth limits at 80% of the initiator port's published capacity to account for Fibre Channel protocol overhead and frame encapsulation. For bandwidth normalization, the IO controller 408 supports both equal distribution and weighted distribution methods across multiple initiator ports, allowing for either uniform bandwidth allocation or prioritized distribution based on specific criteria. In NPIV environments, the IO controller 408 works with FDMI information to treat multiple WWNs as a single unit, ensuring that the combined bandwidth consumption of all virtual ports associated with a physical HBA port remains within capacity limits. By actively managing data transmission rates and monitoring credit buffer utilization, the IO controller 408 maintains optimal performance while preventing the spread of congestion conditions across the storage network In embodiments, the controller can include a memory 410 that stores masking information, port mappings, and FDMI data required for managing connections and bandwidth allocation. The memory 410 maintains current IO consumption metrics and threshold settings for each initiator port. The memory 410 also stores information about WWN relationships in NPIV environments, which allows multiple WWNs to be treated as a single unit for bandwidth management purposes.

The following text includes details of a method(s) or a flow diagram(s) per embodiments of this disclosure. For simplicity of explanation, each method is depicted and described as a set of alterable operations. Additionally, one or more operations can be performed in parallel, concurrently, or in a different sequence. Further, not all the illustrated operations are required to implement each method described by this disclosure.

Figure 5:
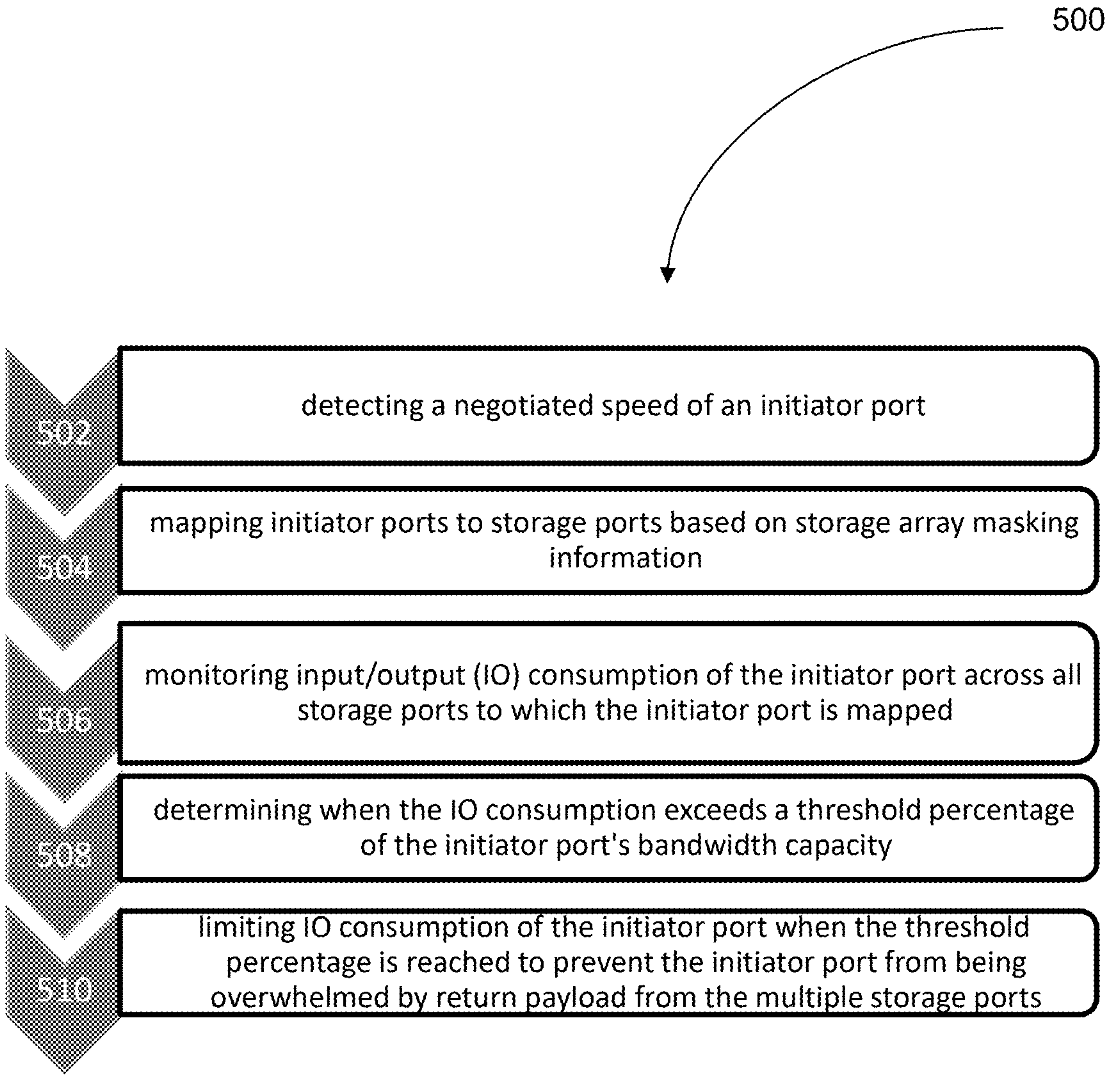
FIG. 5 is a flow diagram of a method for controlling bandwidth for storage port communications per embodiments of the present disclosure.

Regarding FIG. 5, a method 500 relates to controlling bandwidth for storage port communications. In embodiments, the controller 142 of FIG. 1 can perform all or a subset of operations corresponding to the method 500.

For example, the method 500, at 502, can include detecting a negotiated speed of an initiator port. At 504, the method 500 can include mapping initiator ports to storage ports based on storage array masking information. The method 500, at 506, can also include monitoring input/output (IO) consumption of the initiator port across all storage ports to which the initiator port is mapped. In addition, the method 500, at 508, can include determining when the IO consumption exceeds a threshold percentage of the initiator port's bandwidth capacity. Further, at 510, the method 500 can include limiting IO consumption of the initiator port when the threshold percentage is reached to prevent the initiator port from being overwhelmed by return payload from the multiple storage ports.

Further, each operation can include any combination of techniques implemented by the embodiments described herein. Additionally, one or more of the storage array's components 108 can implement one or more of the operations of each method described above.

Using the teachings disclosed herein, a skilled artisan can implement the above-described systems and methods in digital electronic circuitry, computer hardware, firmware, or software. The implementation can be a computer program product. Additionally, the implementation can include a machine-readable storage device for execution by or to control the operation of a data processing apparatus. The implementation can, for example, be a programmable processor, a computer, or multiple computers.

A computer program can be in any programming language, including compiled or interpreted languages. The computer program can have any deployed form, including a stand-alone program, subroutine, element, or other units suitable for a computing environment. One or more computers can execute a deployed computer program.

One or more programmable processors can perform the method steps by executing a computer program to perform the concepts described herein by operating on input data and generating output. An apparatus can also perform the steps of the method. The apparatus can be a special-purpose logic circuitry. For example, the circuitry is an FPGA (field-programmable gate array) or an ASIC (application-specific integrated circuit). Subroutines and software agents can refer to portions of the computer program, the processor, the special circuitry, software, or hardware that implements that functionality.

Processors suitable for executing a computer program include, by way of example, both general and special purpose microprocessors and any one or more processors of any digital computer. A processor can receive instructions and data from a read-only memory, a random-access memory, or both. Thus, for example, a computer's essential elements are a processor for executing instructions and one or more memory devices for storing instructions and data. Additionally, a computer can receive data from or transfer data to one or more mass storage device(s) for storing data (e.g., magnetic, magneto-optical disks, solid-state drives (SSDs, or optical disks).

Data transmission and instructions can also occur over a communications network. Information carriers that embody computer program instructions and data include all nonvolatile memory forms, including semiconductor memory devices. The information carriers can, for example, be EPROM, EEPROM, flash memory devices, magnetic disks, internal hard disks, removable disks, magneto-optical disks, CD-ROM, or DVD-ROM disks. In addition, the processor and the memory can be supplemented by or incorporated into special-purpose logic circuitry.

A computer with a display device enabling user interaction can implement the above-described techniques, such as a display, keyboard, mouse, or any other input/output peripheral. The display device can, for example, be a cathode ray tube (CRT) or a liquid crystal display (LCD) monitor. The user can provide input to the computer (e.g., interact with a user interface element). In addition, other kinds of devices can enable user interaction. Other devices can, for example, be feedback provided to the user in any form of sensory feedback (e.g., visual feedback, auditory feedback, or tactile feedback). For example, input from the user can be in any form, including acoustic, speech, or tactile input.

A distributed computing system with a back-end component can also implement the above-described techniques. The back-end component can, for example, be a data server, a middleware component, or an application server. Further, a distributing computing system with a front-end component can implement the above-described techniques. The front-end component can, for example, be a client computer with a graphical user interface, a web browser through which a user can interact with an example implementation, or other graphical user interfaces for a transmitting device. Finally, the system's components can interconnect using any form or medium of digital data communication (e.g., a communication network). Examples of communication network(s) include a local area network (LAN), a wide area network (WAN), the Internet, a wired network(s), or a wireless network(s).

The system can include a client(s) and server(s). The client and server (e.g., a remote server) can interact through a communication network. For example, a client-and-server relationship can arise when computer programs run on the respective computers and have a client-server relationship. Further, the system can include a storage array(s) that delivers distributed storage services to the client(s) or server(s).

Packet-based network(s) can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network(s), 802.16 network(s), general packet radio service (GPRS) network, HiperLAN), or other packet-based networks. Circuit-based network(s) can include, for example, a public switched telephone network (PSTN), a private branch exchange (PBX), a wireless network, or other circuit-based networks. Finally, wireless network(s) can include RAN, Bluetooth, code-division multiple access (CDMA) networks, time division multiple access (TDMA) networks, and global systems for mobile communications (GSM) networks.

The transmitting device can include, for example, a computer, a computer with a browser device, a telephone, an IP phone, a mobile device (e.g., cellular phone, personal digital assistant (PDA) device, laptop computer, electronic mail device), or other communication devices. The browser device includes, for example, a computer (e.g., desktop computer, laptop computer) with a World Wide Web browser (e.g., Microsoft® Internet Explorer® and Mozilla®). The mobile computing device includes, for example, a Blackberry®.

Comprise, include, or plural forms of each are open-ended, include the listed parts, and contain additional unlisted elements. Unless explicitly disclaimed, the term 'or' is open-ended and includes one or more of the listed parts, items, elements, and combinations thereof.

What is claimed is:

1. A method comprising:

detecting, by a storage array, from a switch in a storage area network (SAN), a negotiated speed of an initiator port;

mapping initiator ports to multiple storage ports based on storage array masking information;

monitoring, by the storage array, input/output (IO) consumption of the initiator port across all the multiple storage ports to which the initiator port is mapped, wherein the monitoring comprises tracking aggregate return payload data from all of the multiple storage ports mapped to the initiator port;

determining, by the storage array, when the IO consumption exceeds a threshold percentage of the initiator port's bandwidth capacity, wherein the threshold percentage accounts for protocol overhead in the SAN; and limiting, by the storage array, IO consumption of the initiator port when the threshold percentage is reached to prevent the initiator port from being overwhelmed by return payload from the multiple storage ports, wherein limiting the IO consumption comprises controlling a data transmission rate from each of the multiple storage ports to the initiator port based on the aggregate return payload data.

2. The method of claim 1, further comprising:

detecting the negotiated speed of the initiator port by reading the speed from a switch associated with the initiator port.

3. The method of claim 1, further comprising:

detecting a plurality of World Wide Names (WWNs) corresponding to a single physical host bus adapter (HBA) port by reading Fabric Device Management Interface (FDMI) information corresponding to the initiator port from the switch.

4. The method of claim 1, further comprising:

monitoring aggregate IO consumption across all WWNs associated with the single physical HBA port; and limiting IO consumption based on the aggregate consumption of all WWNs on the single HBA port.

5. The method of claim 1, further comprising:

normalizing bandwidth allocation across multiple initiator ports using one of equal distribution or weighted distribution.

6. The method of claim 1, further comprising:

preventing credit buffer overflow in the switch by controlling IO consumption between the initiator port and the multiple storage ports to avoid exhausting available credit buffers.

7. The method of claim 6, further comprising:

preventing credit buffer exhaustion by controlling a rate at which data is sent from the multiple storage ports to the initiator port.

8. The method of claim 1, further comprising:

tracking both IO operations per second (IOPS) and megabytes per second across the multiple storage ports.

9. The method of claim 1, wherein the initiator port includes a host bus adapter (HBA) port operating in an NPIV environment with multiple WWNs associated with a single physical HBA port.

10. The method of claim 1, wherein the initiator port includes a host bus adapter (HBA) port operating in a non-NPIV environment.

11. An apparatus with a memory and processor, the apparatus configured to:

detect, by a storage array, from a switch in a storage area network (SAN), a negotiated speed of an initiator port;

mapping initiator ports to multiple storage ports based on storage array masking information;

monitor, by the storage array, input/output (IO) consumption of the initiator port across all the multiple storage ports to which the initiator port is mapped, wherein the monitoring comprises tracking aggregate return payload data from all of the multiple storage ports mapped to the initiator port;

determine, by the storage array, when the IO consumption exceeds a threshold percentage of the initiator port's bandwidth capacity, wherein the threshold percentage accounts for protocol overhead in the SAN; and limit, by the storage array, IO consumption of the initiator port when the threshold percentage is reached to prevent the initiator port from being overwhelmed by return payload from the multiple storage ports, wherein limiting the IO consumption comprises controlling a data transmission rate from each of the multiple storage ports to the initiator port based on the aggregate return payload data.

12. The apparatus of claim 11, further configured to:

detect the negotiated speed of the initiator port by reading the speed from a switch associated with the initiator port.

13. The apparatus of claim 11, further configured to:

detect a plurality of World Wide Names (WWNs) corresponding to a single physical host bus adapter (HBA) port by reading Fabric Device Management Interface (FDMI) information corresponding to the initiator port from the switch.

14. The apparatus of claim 11, further configured to:

monitor aggregate IO consumption across all WWNs associated with the single physical HBA port; and limit IO consumption based on the aggregate consumption of all WWNs on the single HBA port.

15. The apparatus of claim 11, further configured to:

normalize bandwidth allocation across multiple initiator ports using one of equal distribution or weighted distribution.

16. The apparatus of claim 11, further configured to:

prevent credit buffer overflow in the switch by controlling IO consumption between the initiator port and the multiple storage ports to avoid exhausting available credit buffers.

17. The apparatus of claim 16, further configured to:

prevent credit buffer exhaustion by controlling a rate at which data is sent from the multiple storage ports to the initiator port.

18. The apparatus of claim 11, further configured to:

track both IO operations per second (IOPS) and megabytes per second across the multiple storage ports.

19. The apparatus of claim 11, wherein the initiator port includes a host bus adapter (HBA) port operating in an NPIV environment with multiple WWNs associated with a single physical HBA port.

20. The apparatus of claim 11, wherein the initiator port includes a host bus adapter (HBA) port operating in a non-NPIV environment.

* * * * *